Oct. 14, 1958

O. E. WOLF 2,856,502

COOKING APPARATUS

Filed Dec. 7, 1956

INVENTOR
ORRIN E. WOLF
BY Andrew B. Hubbard
ATTORNEY

Oct. 14, 1958     O. E. WOLF     2,856,502
COOKING APPARATUS
Filed Dec. 7, 1956     5 Sheets-Sheet 2

INVENTOR
ORRIN E. WOLF
BY *Andrew G. Hubbard*
ATTORNEY

Oct. 14, 1958   O. E. WOLF   2,856,502
COOKING APPARATUS
Filed Dec. 7, 1956   5 Sheets-Sheet 3
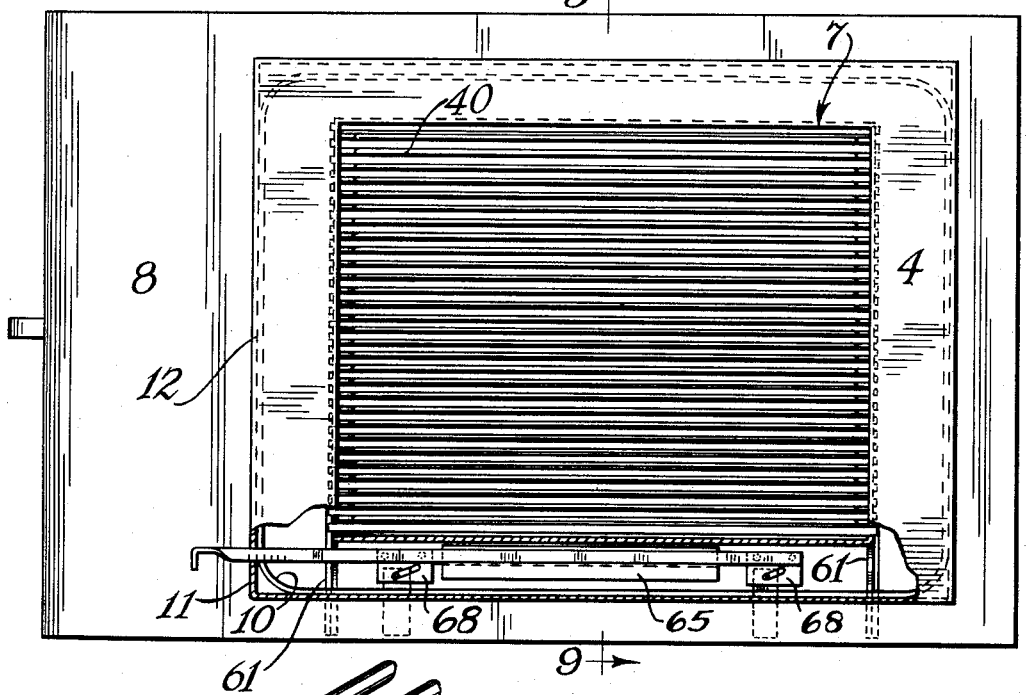
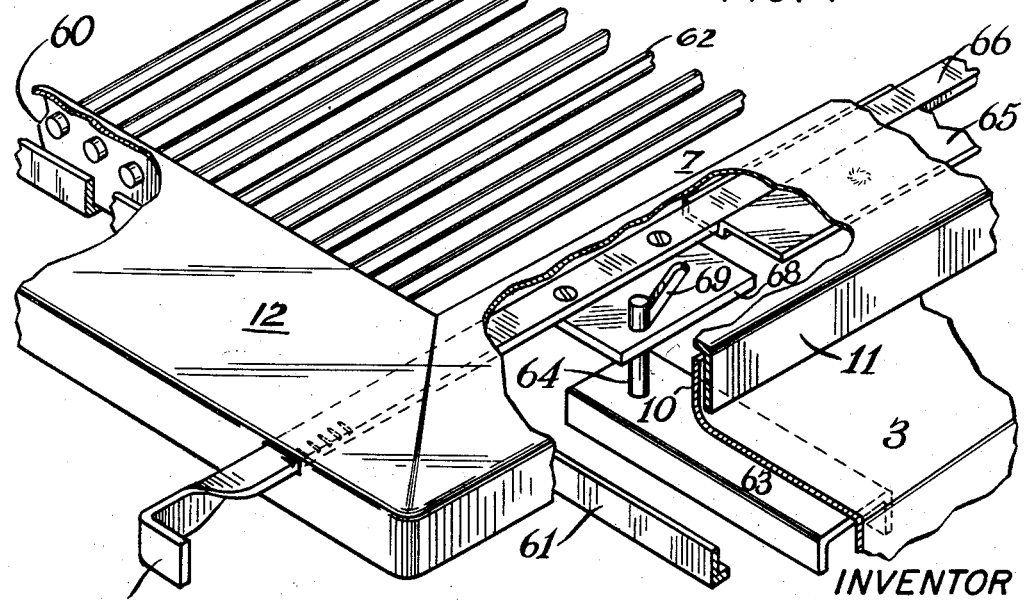
INVENTOR
ORRIN E. WOLF
BY Andrew B. Hubbard
ATTORNEY Oct. 14, 1958     O. E. WOLF     2,856,502
COOKING APPARATUS Filed Dec. 7, 1956                                                     5 Sheets-Sheet 4

INVENTOR
ORRIN E. WOLF
BY Andrew G. Hubbard
ATTORNEY

Oct. 14, 1958     O. E. WOLF     2,856,502
COOKING APPARATUS
Filed Dec. 7, 1956                             5 Sheets-Sheet 5
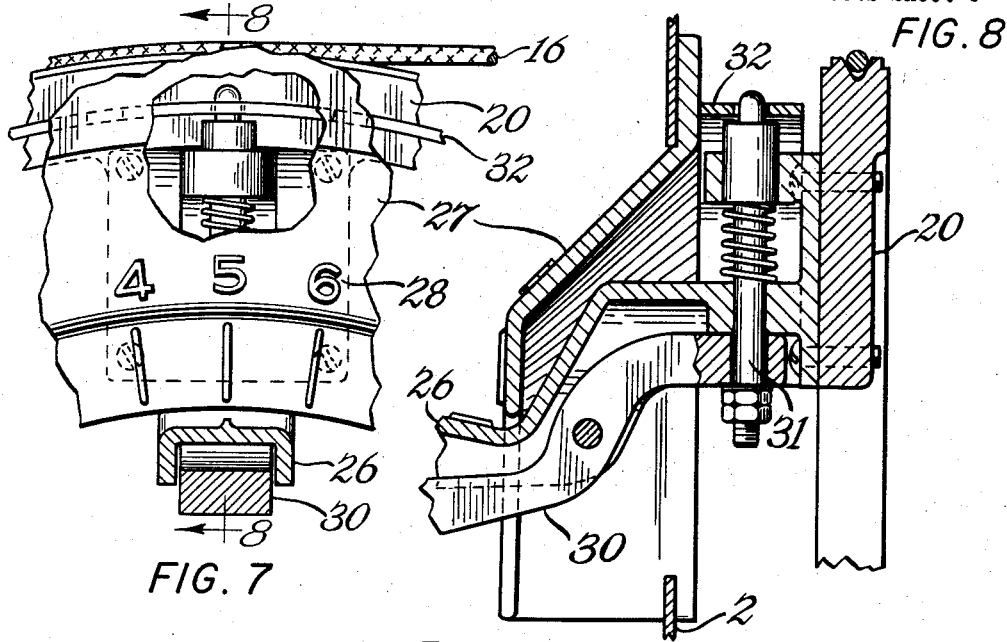
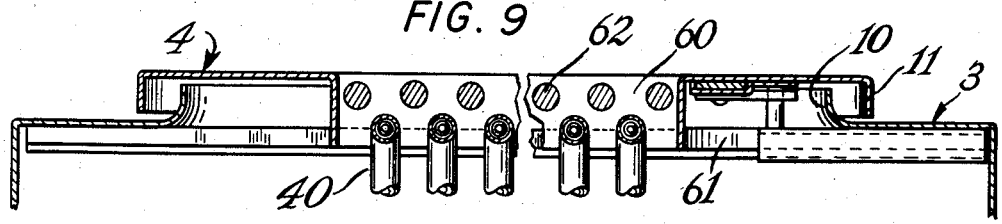
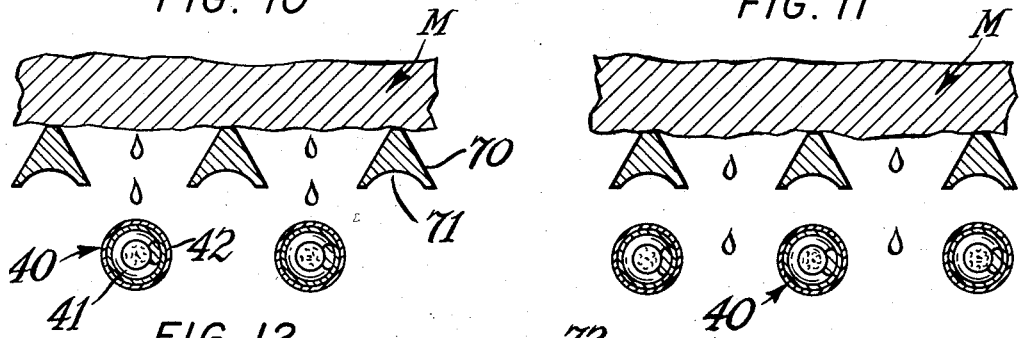
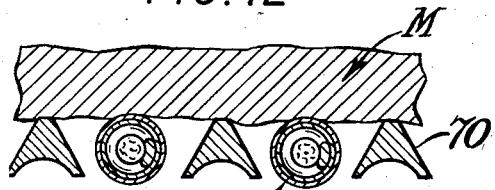
INVENTOR
ORRIN E. WOLF
BY Andrew B. Hubbard
ATTORNEY United States Patent Office 2,856,502
Patented Oct. 14, 1958

2,856,502

COOKING APPARATUS

Orrin E. Wolf, McHenry, Ill., assignor to General Electric Company, a corporation of New York Application December 7, 1956, Serial No. 626,851

13 Claims. (Cl. 219—37)

This invention relates to cooking apparatus and, in particular, to apparatus which although essentially a broiler, is adaptable for surface cooking operations in which a wide variety of temperatures and heating rates may be required.

Primarily, my invention is useful in cooking apparatus for restaurant and other heavy duty service.

Heavy duty cookery must satisfy the relatively unpredictable demands of the clientele, and meet such demands quickly and efficiently. At breakfast, the orders are usually for dishes which are best cooked at relatively low temperatures; the luncheon menu may feature hamburgers or similar foods which are griddled at rather high temperatures; and at dinner, there may be many demands for broiled steaks or the like. During the lull between the principal mealtimes, the chef prepares his soups and other materials requiring long periods of simmering or gentle boiling.

A large and well-equipped restaurant kitchen may have several specialized cooking devices, such as broilers, griddles, ranges, and fry kettles. A smaller kitchen may have a single broiler, a range, and a fry kettle. This relatively limited equipment is often not flexible enough for the small restaurant with a large clientele only at one of the regular mealtimes; the flexibility of the equipment is also limited by the fact that conventional cooking apparatus is relatively massive and, therefore, has an inherent heat lag which makes it difficult quickly to raise the cooking temperature to an elevated level or to lower the temperature to the degree necessary for low temperature cooking operations.

The present invention efficiently supplements all of the normal restaurant cooking equipment with the possible exception of the fryer. As later appears, apparatus embodying my invention is essentially a high performance broiler; but the adustments in the heating arrangements thereof make it capable of producing cooking temperatures ranging from about 200° F. to approximately 1500° F. The cooking surface is arranged so that it may receive the foods directly as in broiling, or may serve as a cooking top for skillets, griddling sheets, pots, or the like, for other cooking operations.

It is therefore an object of the invention to provide apparatus which although designed primarily for the broiling of meat, is highly efficient when used as a regular cooking top for pot and skillet work.

It is another object of the invention to provide a cooking device in which radiant, convected, or conducted heat is instantly available at the option of the chef.

It is a further object of the invention to provide a cooking device which does not have a large mass to delay the attainment of the desired cooking temperature, or to retain heat after a particular cooking operation, thereby reducing to a minimum the start-up and cooling-off times of the apparatus.

It is another object of the invention to provide a broiling device embodying electric heating units which can be brought into actual contact with the meat to sear the fibers thereof, and then quickly moved to another position to complete the broiling; whereby inexpensive cuts of meat having a low fat content may be broiled to an appetizing brown color.

It is still another object of the invention to provide a broiling device which permits the chef immediately to adjust the apparatus for "smoke" or "charcoal" type broiling or for smokeless broiling.

In a presently preferred embodiment of the invention, the above noted features and objects may be obtained in apparatus of compact size compatible with other counter-height cooking appliances. The upper surface is arranged to have a front landing area and a rear cooking area, the latter comprising a framework having a plurality of rods arranged in mutually spaced parallel relation. This framework is disposed over a cooking top opening of substantially the same area; and by means convenient to the chef, the framework may be shifted laterally with respect to the cooking top opening. The grid or framework of rods comprises the actual cooking surface on which meats may be laid for broiling or pots and skillets placed for other cooking operations.

The electrical heating unit is disposed within the body immediately below the cooking top framework. It comprises a support structure mounting a plurality of electrical heating elements of the tubular metallic sheathed type, arranged in mutually spaced relation and extending parallel to the cooking top rods in a plane parallel to that of the rods. The spacing between the heating elements is the same as that between the rods; for example, the heating elements and the rods may be arranged on five-eighth inch centers. The heating unit support structure is guided within the apparatus for vertical movement between positions in which the respective heating elements may be one-eighth of an inch above the rods, or one or two inches below the rods, at the option of the chef.

It will be apparent that, because the cooking top framework is laterally adjustable and the heating unit is vertically adjustable, the respective heating elements may occupy a position in which they are between the respective rods at any selected height relative thereto, or actually beneath the rods and at a suitable height ranging from actual contact with the underside of the rods to a suitable spacing therefrom, according to the cooking requirements. This relative adjustability of the cooking top and heating elements provides a simple means for immediately changing the radiant, conducted, or convected heat applicable to the foodstuff or utensil on the cooking top. As a further means to control the thermal output, a damper is provided to regulate the circulation of air over the heating elements, whereby moderations of convected heat may be obtained.

Other features and advantages will be understood from the following detailed description of a presently preferred embodiment as shown in the accompanying drawings in which:

Fig. 3 is a top plan view of the apparatus with a portion of the cooking surface frame broken away to show the lateral adjustment means thereof;

Fig. 4 is an enlarged fragmentary perspective view to show the lateral adjustment means of the cooking surface frame;

Fig. 7 is a fragmentary front elevation showing the indexing and detent mechanism for the vertical adjustment of the heating unit support structure;

Fig. 8 is a fragmentary side elevation of the same;

Fig. 9 is a fragmentary front elevation taken in section on lines 9—9 of Fig. 3 showing one form of cooking surface grids and one relation of the heating elements thereto;

Figs. 10, 11 and 12 are somewhat schematic representations showing a different type of cooking surface grid construction and typical relations of the heating elements and cooking surface grids permitted by the present invention; and Fig. 13 is another schematic representation, showing another grid form and the manner in which a heating element can be brought into actual heat transfer contact with one of the cooking top grids.

General description

Figure 1:
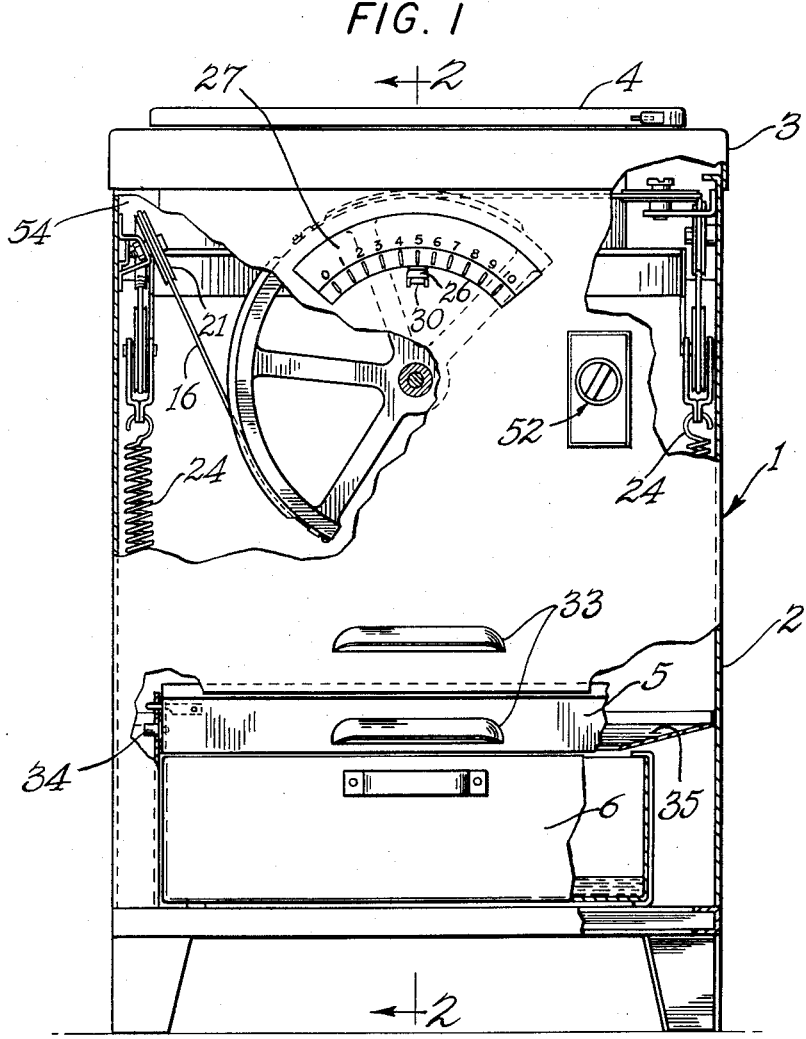
Fig 1 is a front elevation of cooking apparatus embodying the present invention; certain portions of the body structure have been broken away to reveal underlying structure.

The cooking apparatus 1 shown in Fig. 1 comprises a main body structure 2 having a cooking top 3, a cooking surface 4 carried thereon, an adjustable air inlet damper 5, and a grease drawer 6. The height of the body portion from floor to cooking top is preferably the order of thirty-two inches to match with other counter-height appliances in the kitchen. The width and depth may be as desired but are relatively compact. For example, the cooking top may be twenty inches wide and thirty-eight inches deep, with the actual cooking area 7 being about sixteen by twenty inches. A work surface or "landing area" 8 of about twelve inches by twenty inches dimension is provided in the front of the cooking top. The cooking top is formed with an opening defined by the flange 10; and the downwardly depending flange portions 11 of the frame 12, which define the cooking surface 4, are in overlapping relation with the flange 10, as shown in Fig. 4.

Figure 2:
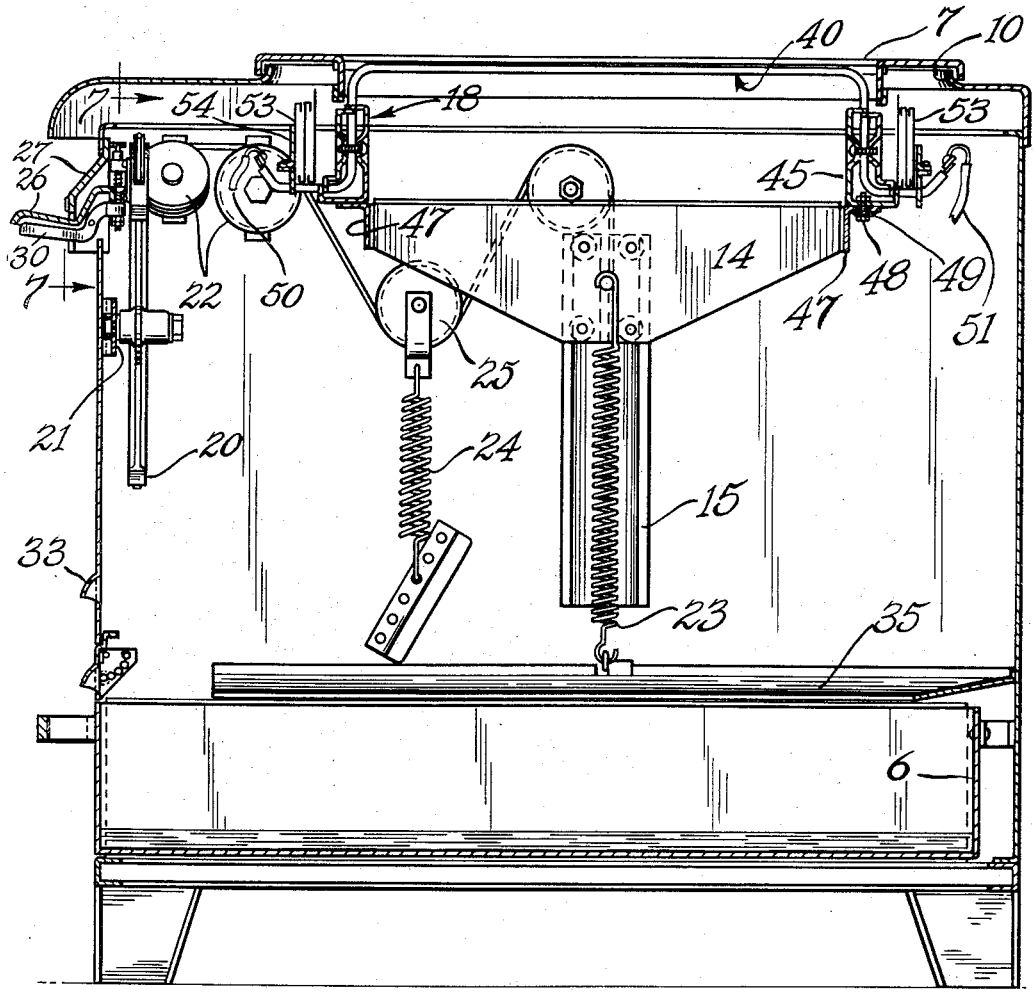
Fig. 2 is a side sectional elevation of the apparatus as taken on lines 2—2 of Fig. 1 and showing the heating elements near their maximum vertical position.
Figure 6:
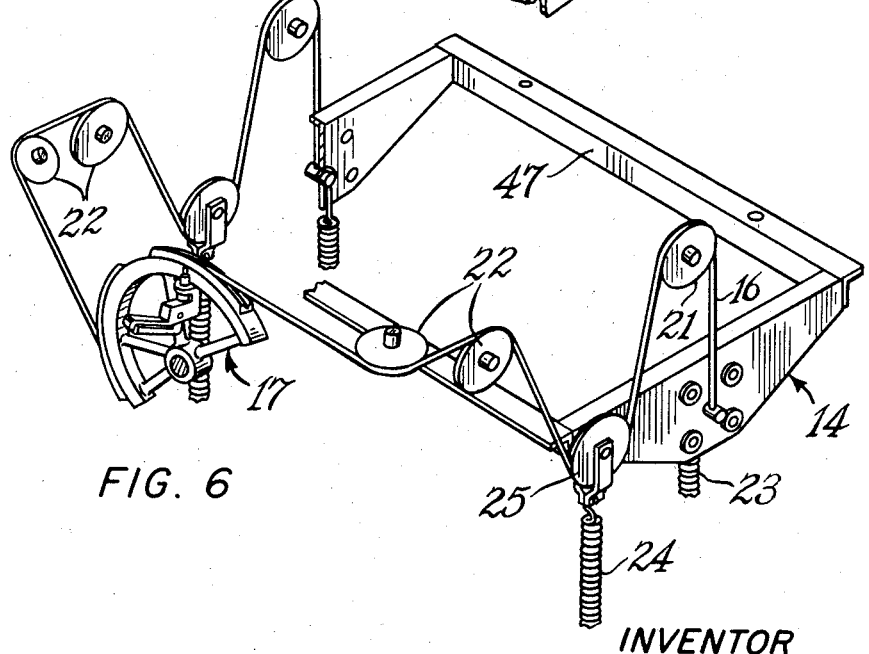
Fig. 6 is a fragmentary perspective view showing a method of elevating and guiding the heating unit support structure.

Within the body portion of the apparatus, a support structure 14 is guided in vertical trackways 15 for vertical movement relative to the cooking top, and by the elevating cord 16, and elevating mechanism 17, the structure 14 may be established within prescribed limits at any desired height relative to the cooking top. The support structure 14 fixedly carries the heating unit assembly 18, as later more fully described. The elevating mechanism 17, as best shown in Figs. 2, 7, and 8 includes a wheel segment 20 rotatably carried on a member 21 at the front panel of the body. The respective ends of the cord 16 are fastened to the segment 20, as shown in Fig. 6. It will be understood that the word "cord" is intended to mean any flexible chain, wire rope, or the like, capable of withstanding the relatively high temperatures which may be reached within the body. The cord passes over the several idler pulleys 22, as are necessary for the illustrated directional changes. The spring 23 serves as a downhaul for the structure 14 and the spring 24 and pulley 25 maintain tension in the cord. Advantageously, there is a downhaul spring and a tension spring at each side of the apparatus for balanced operation.

The elevating mechanism also includes the handle bracket 26, which is affixed to the wheel 20 and extends through a front wall opening of the body 2 below a fixed segmental shield 27 which has suitable markings 28 indicative of the vertical position of the structure 14 within the body 2. Further, the elevating mechanism includes the detent lever 30 pivotally attached to the handle 26 and loosely engaging the spring biased plunger 31, the end of which enters one of a series of openings in a segment 32 secured to the shield 27. When the support structure 14 is to be established at a new elevation, the operator grasps the handle 26 and detent lever 30 in one hand, squeezes to rotate the lever 30 clockwise, as viewed in Fig. 8, and thus withdraws the bar 31 from the segment 32. The elevating mechanism is then free for movement in the desired direction, and may be locked in the new position by release of the detent lever 30.

The interior of the body structure is permanently ventilated by suitable louvers 33. The damper 5 is used for controlled ventilation; for example, it may be desirable for some cooking operations to rely largely on convected heat, whereupon the damper 5 will be open to permit increased air flow into and through the body. Any suitable means, such as the bullet latch 34 (Fig. 1) may be used to releasably maintain the damper in its adjusted position.

The grease drawer 6 is slidably mounted below the deflector 35. Said deflector catches the drippage from the cooking foodstuffs and drains it into the drawer. When the drawer 6 is removed and the damper is opened to maximum extent, the lower interior of the body portion is accessible for thorough cleaning.

The heating unit

Figure 5:
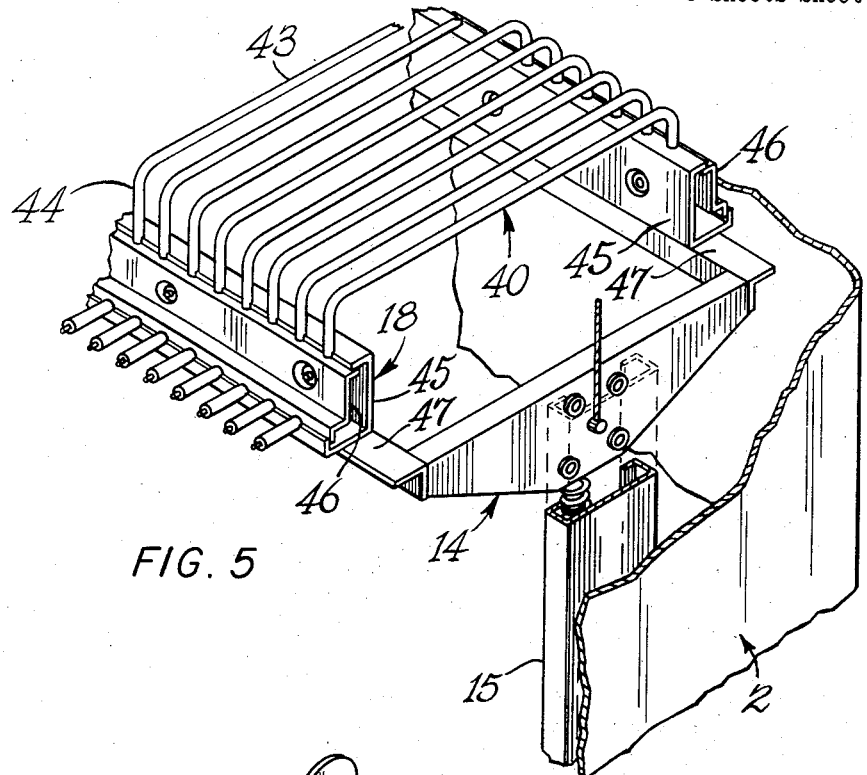
Fig. 5 is a fragmentary perspective view showing a presently preferred structure for mounting the electric heating units.

The heating unit assembly 18 comprises a plurality of metallic sheathed tubular heating elements 40 in which a helical electrical resistance element 41 (Fig. 10) is imbedded in a highly compacted mass of thermally conductive and electrically insulating material, such as MgO, which maintains the resistance element insulated from the metallic outer sheath 42 but permits heat flow thereto. The respective heating elements 40 are formed to have a relatively long horizontal run 43 (Fig. 5) extending longitudinally of the apparatus and the downwardly and outwardly extending end portions 44. Said end portions pass through the suitably notched flanges of the clamping members 45, 46 which are located at the front and rear of the frame 14. The members 45 are advantageously mounted on the transverse rails 47 of the support structure 14 in a manner permitting the expansion and contraction of the heating elements 40. For example, as indicated in Fig. 2, the rear channel member 45 may be slidably mounted on its associated frame member 47 by bolts 48 passing through a suitable slot in the members 45 and 47 and maintained under tension by a spring washer or the like 49. The terminal ends of the heating elements may be connected in parallel by one or more bus bars or the like serving as common terminals for selected groups of heating units, as is well known in the art. According to the desired heating unit circuitry, the respective bus bars are connected by way of leads 50, 51 to a main power source (not shown) through a suitable multiple-circuit switch 52 having its control knob or the like accessible to the chef, as indicated in Fig. 1. It will be understood that the power connections will include suitable fuse protection (not shown).

The terminals and associated lead wires are advantageously protected from the heat of the heating elements as by spaced reflective plates 53 supported by suitable members 54.

The heating elements 40 may have an outside diameter of the order of .250 inch and may be wound for a wattage density of approximately forty watts per square inch, as well understood in the art. The total connected load for heavy duty cooking may be approximately fifteen kw. The horizontal run portion of the heating elements occupies a common horizontal plane.

The cooking surface

The cooking surface 4, best shown in Figs. 3 and 4, comprises a frame 12 constructed of rigid inverted channel members and defining an open central portion 7 which forms the actual cooking area. The flanges 60 of the transverse portions of frame 12 rest slidably on rigid guide members 61; said guide members maintain the frame out of rubbing contact with the cooking top 3.

The flanges 60 serve as anchorages for a plurality of rods 62, arranged in mutually spaced parallel relation in a common horizontal plane. The rods 62 and heating elements 40 are in equal number, and, desirably, the rods and the heating elements are equal in diameter. The rods and heating elements are equally spaced; the preferred spacing will permit the heating elements to pass between the rods with about one thirty-second inch clearance on each side, as presently explained.

The frame 12 is arranged for lateral shifting, so that the rods 62 may be in various lateral relation to the heating elements 40. A suitable shift mechanism is illustrated in Fig. 4. The underside of the cooking top is provided with a pair of rigid brackets 63, one end of each of which projects into the cooking top opening. A fixed pin 64 projects upwardly from each bracket 63. A guide channel 65 is secured to the underside of one of the lateral members of the frame 12 and slidably confines a bar 66. Said bar 66 projects through the transverse flanges of the front frame member and terminates in a suitable handle portion 67. Bar 66 has affixed thereto the plates 68, each formed with a cam slot 69 through which the pins 64 extend. It will be apparent that as the bar 66 is drawn outwardly, the entire frame 12 will move to the right, as viewed in Fig. 4, to the extent permitted by the length of the cam slot 69.

A second form of cooking surface bar is illustrated in Fig. 10. This bar 70 is essentially triangular in cross section, apex up, and having a concave bottom 71 with the same radius as that of the sheath 42 of the heating elements. Fig. 13 shows a third form in which the bar 72 comprises a portion of a tubular member in which the inside radius is equal to that of the sheath 42. The concave bottom of bar 70 and the tubular form 72 permit the heating elements 40 to be brought into surface engagement with the bars over a substantial area when it is desired to have direct heat conduction from the heating elements to the bars.

Operation

The cooking apparatus disclosed herein is essentially a broiler. A restaurant chef may be called on to furnish broiled meats or chops rare, medium, or well-done upon order; but regardless of the "doneness" of the product, his customers demand that the meat have a crisp exterior and an appetizing brown color, with the almost black markings of the grid. The chef must also be prepared to "smoke broil" the product, for this type of broiling produces the often popular "charcoal broiled" effect. Finally, a restaurant may offer various cuts and qualities of meat; and it is well-known that the cheaper cuts of meat are the most difficult to broil to suitable standards of tenderness and appearance.

Figs. 10, 11, and 12 illustrate relative positions of the cooking surface rods and heating elements which may occur during a broiling operation. The meat M is placed on the bars 62, 70, or 72, as the case may be, and the frame 12 shifted to position the bars between the heating elements. The heating elements, previously energized to bring them to their operating temperature, are raised by means of the previously described elevating mechanism to bring the elements actually in surface contact with the meat. The meat quickly sears and acquires the desirable marking. The chef may then lower the heating unit, turn the meat over, and bring the heating elements again into contact to sear and mark the other surface. Thereafter the chef lowers the heating unit and continues the broiling operation until the condition of doneness specified by the customer is obtained. The chef can readily control the useful radiant energy of the broiler by selecting the distance between the heating elements and the meat and by wholly or partially shadowing the heating elements by the rods.

If the meat is to be smoke broiled, the chef maintains the rods between and above the heating elements, whereupon the juices dripping from the meat will strike the heating units and be ignited thereby. If he does not wish to smoke broil, the rods are established in the Fig. 11 position in which the greater portion of the juices will drip between the heating elements.

For fast pot and skillet cookery, the chef can place the pot or skillet on the rods 62 and then bring the cooking heating elements into actual surface contact with the bottom of the cooking vessel. He may in this fashion bring liquids to a vigorous boil, and thereupon maintain the operation at a slow boil by dropping the heating unit a suitable distance below the rods. With the triangular heating units 70, shown in Fig. 10, and the segmental tubular units 72, of Fig. 13, rapid surface cookery can be obtained by bringing the heating elements into surface contact with the concave underside of the rods, whereupon the heat flow to the cooking vessel is directly through the rods themselves. Although it is obvious that this arrangement will not provide maximum rate of heat transfer from the heating elements to the cooking appliance, it does have the advantage of protecting the heating elements from excess abrasion. Even though the several forms of cooking surface rods are of low heat capacity, they can be cooled down at a faster than normal rate by suitably opening the damper 5 to facilitate cool air movement through the cooking surface.

Although the electrical circuit for energizing the respective heating elements is not a part of my invention, the damper, and the relative adjustability of the heating units to the cooking surface make it possible to obtain a wide range of cooking temperatures even if the electrical circuit was arranged to energize the heating elements always at maximum wattage. For example, when the heating elements are lowered to the maximum extent and the damper opened to its maximum, the heat available at the cooking top is largely convected heat of sufficiently low intensity to maintain a cooking vessel at simmering temperature.

While there has been described what is at present considered to be the preferred embodiment of the invention, it will be understood that various modifications may be made therein, and it is intended to cover in the appended claims all such modifications as fall within the scope of the invention.

I claim:

1. Cooking apparatus comprising a food-supporting surface including a multiplicity of rods arranged in closely spaced parallel relation to provide a large area on which foods may be directly placed for broiling, a multiplicity of electric heating elements arranged in mutually spaced parallel relation below said rods, said heating elements extending in the direction of said rods and being substantially coextensive therewith, means for connecting said heating elements to a source of electrical energy, and means for independently adjusting the vertical and the lateral space relation of the rods to the heating elements.

2. Cooking apparatus comprising a food-supporting surface including a multiplicity of rods arranged in closely spaced parallel relation in a common plane to provide a large area on which foods may be directly placed for broiling, a multiplicity of rigid electrical heating elements arranged in closely spaced parallel relation below said rods, said heating elements being substantially coextensive with said rods and occupying a plane parallel to that of the rods, to define a radiant heat source substantially equal in area to that of the food-supporting surface, means for connecting said heating elements to a source of electrical energy, and means for effecting a lateral displacement of said rods relative to said heating elements whereby the impingement of radiant heat energy against the foods on said food-supporting surface may be regulated by imposing portions of the rods over the heating elements.

3. Cooking apparatus comprising a food-supporting surface including a multiplicity of rods arranged in mutually spaced parallel relation in a common plane, a multiplicity of tubular metallic sheathed electrical heating elements arranged in mutually spaced parallel relation below said rods, said heating elements being parallel to said rods and occupying a plane parallel to said rods, means for connecting said heating elements to a source of electrical energy, means for adjusting the vertical spacing between said rods and said heating elements, and means for adjusting the lateral relationship between said rods and said heating elements.

4. Cooking apparatus comprising a food-supporting surface including a multiplicity of rods arranged in mutually spaced relation in a common plane, a multiplicity of tubular metallic sheathed electrical heating elements arranged in mutually spaced parallel relation below said rods and extending parallel to said rods, the spacing between adjacent rods being substantially equal to the spacing between adjacent heating elements, means for connecting said heating elements to a source of electrical energy, means for bringing said heating elements into or out of engagement with said rods, and means for establishing said heating elements and said rods in a mutually offset vertical relationship.

5. Cooking apparatus according to claim 4 in which the underside of said rods is configured for surface contact with a substantial portion of the sheath of the heating elements when said elements are brought into engagement therewith.

6. Cooking apparatus comprising a body providing a cooking top, a structure including a plurality of rods arranged in mutually spaced parallel relation in a common plane on said cooking top, means for effecting lateral movement of said rods, as a unit, on said cooking top, said structure being over an opening in said cooking top at all times and providing for the support of food placed directly thereon or, alternatively, for the support of a cooking utensil, heating means including a plurality of tubular sheathed electric heating elements arranged within said body in parallel spaced relation, a portion of said heating elements being substantially coextensive with said rods and parallel to said rods, means disposed within said body for maintaining said heating means in registry with the opening in said cooking top, said last-named means being arranged for guiding said heating means in vertical movement relative to said food-supporting structure, means accessible externally of said body for establishing the position of said heating means productive of a desired vertical relation between said food-supporting structure and said heating means, and means for connecting said heating means to a source of electrical energy.

7. Cooking apparatus as in claim 6, in which the spacing of said rods is slightly greater than the diameter of said heating elements.

8. Cooking apparatus as in claim 6, in which the maximum width of said rods is such as to comprehend a substantial portion of the diameter of said heating elements when said rods are disposed vertically over said heating elements.

9. Cooking apparatus as in claim 6, in which said rods are of substantially triangular cross section, and are arranged apex-up.

10. Cooking apparatus as in claim 9, in which the bases of the respective rods have a concavity having a radius of curvature substantially equal to the radius of the sheath of said heating element, said concavity being coextensive with that portion of the heating element which is parallel to said rods.

11. Cooking apparatus according to claim 6, in which the rods comprise segments of tubes disposed convex side up, and in which the concave side has a radius substantially equal to the radius of the heating element sheath.

12. Cooking apparatus comprising a body providing a cooking top, a structure on said cooking top for the support of food placed directly thereon or, alternatively, for the support of a cooking utensil, said structure including a frame and a plurality of rods mounted in said frame in spaced parallel relation and in a common plane, means for effecting guided lateral movement of said frame on said cooking top, said food-supporting structure being over an opening in said cooking top at all times, a support structure disposed within said body, heating means including a plurality of tubular sheathed electric heating elements arranged in parallel mutually spaced relation in said support structure and in parallel relation to said rods, means disposed within said body for guiding said support structure for vertical movement in registry with said food-supporting structure, means disposed externally of said body for establishing a desired vertical space relationship between said rods and said heating elements, and means for connecting said heating elements to a source of electrical energy.

13. Cooking apparatus comprising a body providing a cooking top, a food-receiving structure on said cooking top, said structure including a frame and a plurality of rods mounted in said frame in spaced parallel relation and in a common plane, means for effecting guided lateral movement of said frame on said cooking top, said food-receiving structure being over an opening in said cooking top at all times, said cooking top opening being coextensive with said food-receiving structure, a support structure disposed within said body below said cooking top opening, heating means including a plurality of tubular sheathed heating elements arranged in parallel mutually spaced relation in said support structure and in parallel relation to said rods, means disposed within said body for guiding said support structure for vertical movement in registry with said food-receiving structure, means disposed externally of said body for effecting vertical movement of said support structure, means for securing said support structure in a desired vertical location, a grease-catching drawer disposed in said body below said heating unit support structure, a damper for admitting room air above said grease drawer for passage by convection between said heating elements and said rods, and means for connecting said heating elements to a source of electrical energy.

References Cited in the file of this patent

UNITED STATES PATENTS

| 2,114,698 | Babin | Apr. 19, 1938 |
| 2,573,115 | Sisto | Oct. 30, 1951 |
| 2,733,332 | Mason | Jan. 31, 1956 |
| 2,738,723 | Jennett | Mar. 20, 1956 |

FOREIGN PATENTS

| 56,171 | Netherlands | Apr. 15, 1944 |